US011872971B2

(12) United States Patent
Seol (10) Patent No.: US 11,872,971 B2
(45) Date of Patent: Jan. 16, 2024

(54) METHOD AND APPARATUS FOR ELECTRIC HYDRAULIC BRAKE

(71) Applicant: HYUNDAI MOBIS CO., LTD., Seoul (KR)

(72) Inventor: Yong Cheol Seol, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 254 days.

(21) Appl. No.: 17/504,561

(22) Filed: Oct. 19, 2021

(65) Prior Publication Data

US 2022/0185248 A1 Jun. 16, 2022

(30) Foreign Application Priority Data

Dec. 16, 2020 (KR) .......................... 10-2020-0176247

(51) Int. Cl.
*B60T 8/17* (2006.01)
*B60T 8/26* (2006.01)
(Continued)

(52) U.S. Cl.
CPC ............ *B60T 8/17551* (2013.01); *B60T 7/12* (2013.01); *B60T 8/17* (2013.01); *B60T 8/17558* (2013.01);
(Continued)

(58) Field of Classification Search
CPC .......... B60T 8/17; B60T 8/17558; B60T 8/26; B60T 8/262; B60T 8/266; B60T 8/268;
(Continued)

(56) References Cited

U.S. PATENT DOCUMENTS

2004/0260447 A1* 12/2004 Hamada ................ B60T 8/4872
701/70
2016/0221559 A1* 8/2016 Kim ....................... B60T 8/367
(Continued)

FOREIGN PATENT DOCUMENTS

CN 101088816 A 12/2007
CN 104736400 A 6/2015
(Continued)

OTHER PUBLICATIONS

Office Action dated Jun. 9, 2023 in corresponding Chinese Patent Application No. 202111521280.7.

*Primary Examiner* — Erick R Solis
(74) *Attorney, Agent, or Firm* — NovoTechIP International PLLC (57) ABSTRACT

According to at least one aspect, the present disclosure provides a method of controlling an electro-hydraulic brake including an electronic brake-force distribution (EBD) control function, the method comprising: an emergency braking determination operation of determining whether emergency braking is required for a vehicle; a motor control operation of controlling a current flowing in a motor connected to a main master cylinder to increase hydraulic pressure supplied to wheel brakes when it is determined that the emergency braking is required; a rear wheel inlet valve closing operation of closing an inlet valve connected to a rear wheel brake for a predetermined time so that a pressure of the rear wheel brake is not increased earlier than a pressure of a front wheel brake; a closed time period calculation operation of calculating a time during which the inlet valve is maintained in a closed state; and a rear wheel inlet valve opening operation of determining whether a time during which the inlet valve is closed exceeds a closed time period (t), maintaining the inlet valve in the closed state until the time reaches the
(Continued)

closed time period (t), and opening the inlet valve when the time exceeds the closed time period (t).

13 Claims, 3 Drawing Sheets

(51) Int. Cl.
    *B60T 8/1755*    (2006.01)
    *B60T 13/14*     (2006.01)
    *B60T 7/12*      (2006.01)
    *B60T 8/32*      (2006.01)
    *B60T 13/68*     (2006.01)

(52) U.S. Cl.
    CPC ............... *B60T 8/26* (2013.01); *B60T 8/262* (2013.01); *B60T 8/266* (2013.01); *B60T 8/268* (2013.01); *B60T 8/326* (2013.01); *B60T 13/142* (2013.01); *B60T 13/686* (2013.01); *B60T 2201/022* (2013.01); *B60T 2201/03* (2013.01); *B60T 2220/04* (2013.01); *B60T 2270/304* (2013.01); *B60T 2270/82* (2013.01); *B60T 2270/88* (2013.01)

(58) Field of Classification Search
    CPC .......... B60T 8/326; B60T 8/3275; B60T 8/94; B60T 13/686; B60T 13/745; B60T 2201/022; B60T 2201/03; B60T 2270/82
    USPC .............................................. 701/71, 76, 78
    See application file for complete search history.

(56) References Cited

U.S. PATENT DOCUMENTS

2016/0272170 A1*   9/2016  Moore ................. B60T 13/686
2020/0079335 A1*   3/2020  Linhoff .................. B60T 8/321

FOREIGN PATENT DOCUMENTS

| | | | | |
|---|---|---|---|---|
| CN | 105835861 A | 8/2016 | | |
| CN | 105936260 A | 9/2016 | | |
| DE | 3742435 A1 | 7/1989 | | |
| WO | WO-2013088581 A1 * | 6/2013 | ............ | B60T 11/101 |
| WO | WO-2020078901 A1 * | 4/2020 | ............. | B60T 13/16 |

* cited by examiner

METHOD AND APPARATUS FOR ELECTRIC HYDRAULIC BRAKE

CROSS-REFERENCE TO RELATED APPLICATIONS

This application claims priority to and the benefit of Korean Patent Application No. 10-2020-0176247 filed on Dec. 16, 2020, the disclosure of which is incorporated herein by reference in its entirety.

BACKGROUND OF THE INVENTION

1. Field of the Invention

The present disclosure relates to an electro-hydraulic brake device and a control method.

2. Discussion of Related Art

Contents described in this section merely provide background information on the present disclosure and do not constitute the related art.

In general, electro-hydraulic brake devices adjust the braking pressures of wheels using hydraulic modulators after a pedal pressure of a driver is detected through a sensor. The electro-hydraulic brake device includes a sensor, a pedal simulator, and a controller. The sensor detects the stroke distance of a pedal so that the driver may identify a desired braking pressure, and the pedal simulator allows the driver to feel the same pedal pressure as in a general hydraulic brake device. The controller determines a braking force desired by the driver through a pedal stroke sensor and a pressure sensor and drives a separate wheel brake mechanism to generate the braking force in a wheel brake.

The wheel brake mechanism generally includes a main master cylinder for forming hydraulic pressure, a hydraulic circuit for transmitting the hydraulic pressure formed in the main master cylinder to a vehicle wheel brake, and a plurality of valves.

Meanwhile, in the brake mechanism, an electronic brake-force distribution (EBD) function is a function of stably distributing the braking force by adjusting the braking force formed in wheel brakes mounted on front wheels and rear wheels. For example, the EBD function is a function of improving the braking performance by adjusting the braking forces of the wheel brakes mounted on the rear wheels according to a situation of a road surface on which a vehicle travels.

However, when emergency braking is required for the vehicle when the EBD function is implemented, before a motor reaches a certain rotational speed, the pressures of the wheel brakes mounted on the rear wheels are increased earlier than the pressures of the wheel brakes mounted on the front wheels, and thus the braking force is formed in the rear wheels earlier. This rear wheel inversion phenomenon degrades the braking stability of the vehicle.

BRIEF SUMMARY OF THE INVENTION

Accordingly, the purpose of the present disclosure is to improve the braking stability of a vehicle when an electronic brake-force distribution (EBD) function is implemented by preventing a rear wheel inversion phenomenon by closing an inlet valve connected to a rear wheel brake for a predetermined time until a motor reaches a predetermined speed and then opening the inlet valve.

According to at least one aspect, the present disclosure provides a method of controlling an electro-hydraulic brake including an electronic brake-force distribution (EBD) control function, the method comprising: an emergency braking determination operation of determining whether emergency braking is required for a vehicle; a motor control operation of controlling a current flowing in a motor connected to a main master cylinder to increase hydraulic pressure supplied to wheel brakes when it is determined that the emergency braking is required; a rear wheel inlet valve closing operation of closing an inlet valve connected to a rear wheel brake for a predetermined time so that a pressure of the rear wheel brake is not increased earlier than a pressure of a front wheel brake; a closed time period calculation operation of calculating a time during which the inlet valve is maintained in a closed state; and a rear wheel inlet valve opening operation of determining whether a time during which the inlet valve is closed exceeds a closed time period (t), maintaining the inlet valve in the closed state until the time reaches the closed time period (t), and opening the inlet valve when the time exceeds the closed time period (t).

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE INVENTION

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary.

Figure 1:
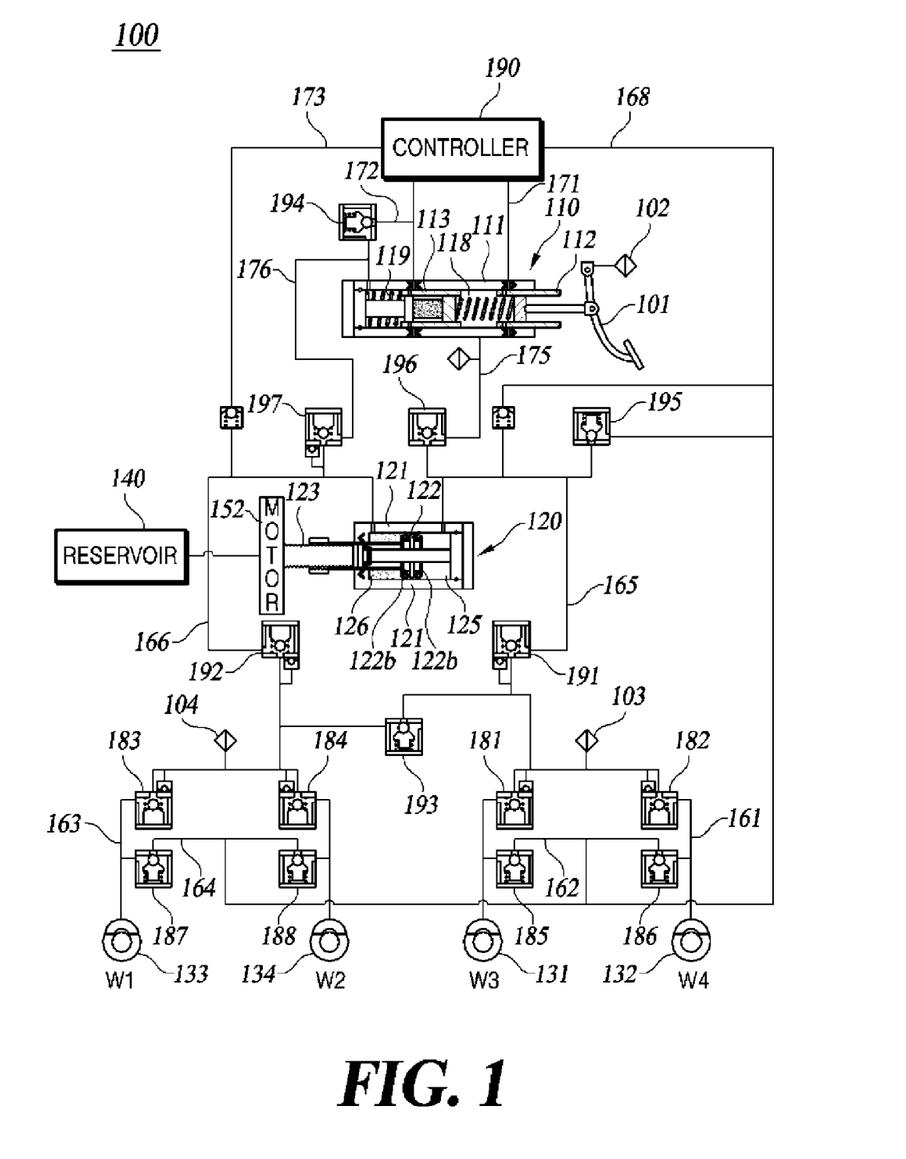
FIG. 1 is a hydraulic circuit diagram of a braking device according to one embodiment of the present disclosure.

FIG. 1 is a hydraulic circuit diagram of a braking device according to one embodiment of the present disclosure.

Referring to FIG. 1, a vehicle braking device 100 according to the embodiment of the present disclosure includes at least a backup master cylinder 110, a main master cylinder 120, wheel brakes 131, 132, 133, and 134, a controller 140, and a motor 152.

The backup master cylinder 110 includes all or some of a backup body 111, a first backup piston 112, a second backup piston 113, a first backup chamber 118, and a second backup chamber 119.

The backup body 111 is formed in a hollow structure. The first backup piston 112 and the second backup piston 113 are arranged in an inner space of the backup body 111 to be linearly movable in a left-right direction. The inner space of the backup body 111 is divided into a first backup chamber 118 that has a space between the first backup piston 112 and the second backup piston 113 and a second backup chamber 119 that is located on the left side of the first backup chamber 118. In the detailed description of the present disclosure, the cross-sectional area of the second backup piston 113 is referred to as Asub.

The main master cylinder 120 is driven by the motor 152 controlled by the controller 140, generates hydraulic pressure inside main chambers 125 and 126, and supplies the hydraulic pressure to the wheel brakes 131, 132, 133, and 134. Here, the controller 140 may be an electronic control unit (ECU) that is a representative control device of a vehicle. When the driver steps on a brake pedal 101, a stroke sensor 102 detects the stroke of the brake pedal 101 to transmit the detected stroke to the controller 140. The controller 140 controls the hydraulic pressure generated in the main master cylinder 120 by controlling the motor 152 on the basis of the depression amount of the brake pedal 101 detected by the stroke sensor 102.

The main master cylinder 120 includes a main body 121, a main piston 122, and a rod 123.

The main body 121 is formed in a hollow structure. The main piston 122 is disposed in an inner space of the main body 121 to be linearly movable in a left-right direction. The inner space of the main body 121 is divided into two parts by the main piston 122, wherein the two parts includes the first main chamber 125 that has a space disposed on the right side of the main piston 122 and the second main chamber 126 that is disposed on the left side of the main piston 122.

In the present specification, terms "left side" and "right side" are merely intended to indicate a direction in which some components are shown in the drawings, and the present disclosure is not limited to the arrangement direction and position thereof.

When the main piston 122 moves forward to the right side, the first main chamber 125 becomes narrower and the second main chamber 126 becomes wider. In contrast, when the main piston 122 moves rearward to the left side, the first main chamber 125 becomes wider and the second main chamber 126 becomes narrower.

In the detailed description of the present disclosure, the right side of the main piston 122 is referred to as a one-stage main piston 122a and the left side of the main piston 122 is referred to as a two-stage main piston 122b. Further, the cross-sectional area of the two-stage main piston 122b is referred to as A2.

The wheel brakes 131, 132, 133, and 134 include a first wheel brake 131 that brakes a front left wheel of the vehicle, a second wheel brake 132 that brakes a front right wheel of the vehicle, a third wheel brake 133 that brakes a rear right wheel of the vehicle, and a fourth wheel brake 134 that brakes a rear left wheel of the vehicle. In the present disclosure, the front side, the rear side, the left side, or the right side may be changed within a technical level of those skilled in the art.

A coupling relationship between the backup master cylinder 110, the main master cylinder 120, and the wheel brakes 131, 132, 133, and 134 will be described.

The first wheel brake 131 and the second wheel brake 132 are interconnected using a first brake line 161. That is, the first brake line 161 has one end connected to the first wheel brake 131 and the other end connected to the second wheel brake 132.

A first inlet valve 181 and a second inlet valve 182 that open or close the first brake line 161 are installed on the first brake line 161. The first inlet valve 181 is disposed adjacent to the first wheel brake 131, and the second inlet valve 182 is disposed adjacent to the second wheel brake 132.

One end of a first recovery line 162 is connected to the first brake line 161 corresponding to a line between the first wheel brake 131 and the first inlet valve 181. Further, the other end of the first recovery line 162 is connected to the first brake line 161 corresponding to a line between the second wheel brake 132 and the second inlet valve 182.

A first outlet valve 185 and a second outlet valve 186 that open or close the first recovery line 162 are installed on the first recovery line 162. The first outlet valve 185 is disposed adjacent to the one end of the first recovery line 162, and the second outlet valve 186 is disposed adjacent to the other end of the first recovery line 162.

The third wheel brake 133 and the fourth wheel brake 134 are interconnected using a second brake line 163. That is, the second brake line 163 has one end connected to the third wheel brake 133 and the other end connected to the fourth wheel brake 134.

A third inlet valve 183 and a fourth inlet valve 184 that open or close the second brake line 163 are installed on the second brake line 163. The third inlet valve 183 is disposed adjacent to the third wheel brake 133, and the fourth inlet valve 184 is disposed adjacent to the fourth wheel brake 134.

Check valves (not shown) that prevent backflow of brake fluid are installed on the first inlet valve 181, the second inlet valve 182, the third inlet valve 183, and the fourth inlet valve 184.

Meanwhile, a first pressure sensor 103 is installed on the first brake line 161 corresponding to a line between the first inlet valve 181 and the second inlet valve 182, and a second pressure sensor 104 is installed on the second brake line 163 corresponding to a line between the third inlet valve 183 and the fourth inlet valve 184.

One end of a second recovery line 164 is connected to the second brake line 163 corresponding to a line between the third wheel brake 133 and the third inlet valve 183. Further, the other end of the second recovery line 164 is connected to the second brake line 163 corresponding to a line between the fourth wheel brake 134 and the fourth inlet valve 184. A third outlet valve 187 and a fourth outlet valve 188 that open or close the second recovery line 164 are installed on the second recovery line 164. The third outlet valve 187 is disposed adjacent to the one end of the second recovery line 164, and the fourth outlet valve 188 is disposed adjacent to the other end of the second recovery line 164.

One end of a first main line 165 is connected to the first main chamber 125. That is, the first main line 165 is connected to the main body 121 so that one end thereof may be in fluid-communication with the first main chamber 125. The other end of the first main line 165 is connected to the first brake line 161 corresponding to a line between the first inlet valve 181 and the second inlet valve 182.

A first traction control valve 191 that opens or closes the first main line 165 is installed on the first main line 165. The first traction control valve 191, which is a solenoid valve that is controlled by the controller 140 to open or close the first main line 165, may be installed on a line that supplies the hydraulic pressure of the first main chamber 125 to the wheel brakes 131, 132, 133, and 134.

One end of a second main line 166 is connected to the second main chamber 126. That is, the second main line 166 is connected to the main body 121 so that one end thereof may be in fluid-communication with the second main chamber 126. Further, the other end of the second main line 166 is connected to the second brake line 163 corresponding to a line between the third inlet valve 183 and the fourth inlet valve 184.

A second traction control valve 192 that opens or closes the second main line 166 is installed on the second main line 166. The second traction control valve 192, which is a solenoid valve that is controlled by the controller 140 to open or close the second main line 166, is installed on a line that supplies the hydraulic pressure of the second main chamber 126 to the wheel brakes 131, 132, 133, and 134.

One end of a mixing line 167 is connected to the first main line 165 corresponding to a line between the first traction control valve 191 and the first brake line 161. Further, the other end of the mixing line 167 is connected to the second main line 166 corresponding to a line between the second traction control valve 192 and the second brake line 163. A mixing valve 193 that opens or closes the mixing line 167 is installed on the mixing line 167.

One end of a first backup line 171 is connected to the first backup chamber 118, and the other end of the first backup line 171 is connected to the second backup chamber 119. That is, the first backup line 171 is connected to the backup body 111 so that one end thereof may be in fluid-communication with the first backup chamber 118 and is connected to the backup body 111 so that the other end thereof may be in fluid-communication with the second backup chamber 119. A reservoir 190 in which the brake fluid is stored is installed on the first backup line 171.

One end of a third recovery line 168 is connected to the reservoir 190. Further, the other end of the third recovery line 168 is divided into two parts, wherein one of the two parts is connected to the first recovery line 162 corresponding to a line between the first outlet valve 185 and the second outlet valve 186, and the other thereof is connected to the second recovery line 164 corresponding to a line between the third outlet valve 187 and the fourth outlet valve 188.

One end of a second backup line 172 is connected to the second backup chamber 119. That is, the second backup line 172 is connected to the backup body 111 so that one end thereof may be in fluid-communication with the second backup chamber 119. The other end of the second backup line 172 is connected to the first backup line 171 corresponding to a line between the reservoir 190 and the backup body 111.

A first backup valve 194 that opens or closes the second backup line 172 is installed on the second backup line 172.

One end of a fifth backup line 175 is connected to the first backup chamber 118. That is, the fifth backup line 175 is connected to the backup body 111 so that one end thereof may be in fluid-communication with the first backup chamber 118. Further, the other end of the fifth backup line 175 is connected to the main body 121. A third backup valve 196 that opens or closes the fifth backup line 175 is installed on the fifth backup line 175. Further, a pressure sensor (not shown) that measures the pressure of the brake fluid in the fifth backup line 175 is installed on the fifth backup line 175. The pressure sensor is installed on the fifth backup line 175 corresponding to a line between the backup body 111 and the third backup valve 196.

One end of a sixth backup line 176 is connected to the second backup chamber 119. That is, the sixth backup line 176 is connected to the backup body 111 so that one end thereof may be in fluid-communication with the second backup chamber 119. Further, the other end of the sixth backup line 176 is connected to the second main line 166 corresponding to a line between the one end of the second main line 166 and the other end of the third backup line 173. A fourth backup valve 197 that opens or closes the sixth backup line 176 is installed on the sixth backup line 176.

The first inlet valve 181 to the fourth inlet valve 184, the first outlet valve 185 to the fourth outlet valve 188, the first traction control valve 191 and the second traction control valve, the mixing valve 193, and the first backup valve 194 to the fourth backup valve 197, which are described above, are formed as solenoid valves to be controlled by the controller 140.

The first inlet valve 181, the second inlet valve 182, the third inlet valve 183, and the fourth inlet valve 184 are formed in a normal open type in which a valve is open in a normal state corresponding to a case in which a control signal is not input from the controller 140.

Further, the first outlet valve 185, the second outlet valve 186, the third outlet valve 187, and the fourth outlet valve 188 are formed in a normal close type in which a valve is closed in the normal state corresponding to a case in which the control signal is not input from the controller 140.

The first traction control valve 191 and the second traction control valve 192 are formed in a normal open type. Further, the mixing valve 193 is formed in a normal close type.

The first backup valve 194 is formed in a normal close type. Further, the second backup valve 195, the third backup valve 196, and the fourth backup valve 197 are formed in a normal open type.

When the brake of the vehicle is controlled by the controller 140, the controller 140 closes all of the second backup valve 195, the third backup valve 196, and the fourth backup valve 197. Then, since the first, second, third, and fourth backup valves 194, 195, 196, and 197 are all closed, a line between the backup master cylinder 110 and the main master cylinder 120 is blocked. Thus, in this case, the wheel brakes 131, 132, 133, and 134 generate a braking force only by the hydraulic pressure supplied by the main master cylinder 120.

However, when electric power is not supplied to the controller 140, since the second backup valve 195, the third backup valve 196, and the fourth backup valve 197 are formed in a normal open type, the second backup valve 195, the third backup valve 196, and the fourth backup valve 197 are maintained in an open state.

Further, when the electric power is not supplied to the controller 140 and when the driver steps on the brake pedal 101, the hydraulic pressure formed in the second backup chamber 119 by receiving the brake fluid from the reservoir 190 is supplied to the second main chamber 126 through the sixth backup line 176.

The fourth backup valve 197 is installed on the sixth backup line 176 connecting the backup master cylinder 110 and the main master cylinder 120. The fourth backup valve 197 is configured to generate a braking force using the backup master cylinder 110 when the controller 140 malfunctions, and for example, the fourth backup valve 197 is configured in a normal open type in which a valve is maintained in an open state even when there is no supply of current.

Figure 2:
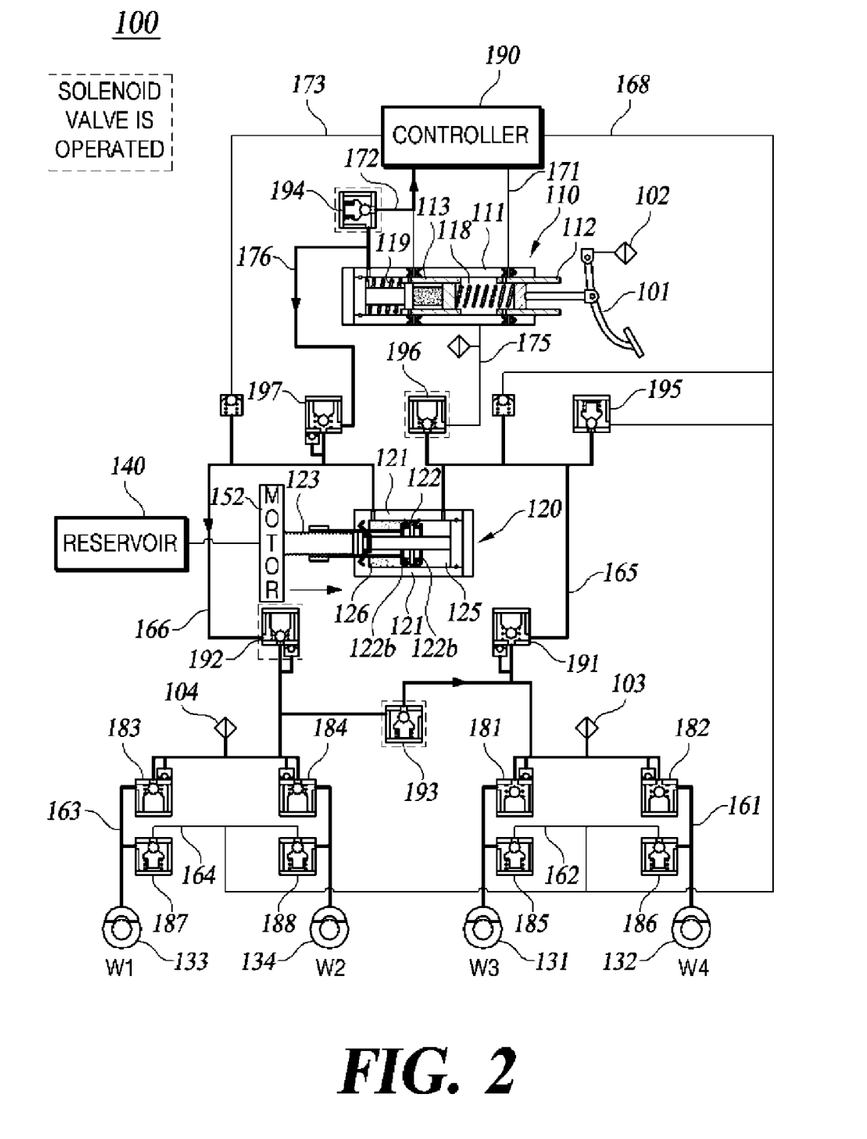
FIG. 2 is a hydraulic circuit diagram showing a flow of brake fluid for a controller to increase or decrease a pressure in a hydraulic circuit in an electronic brake-force distribution (EBD) situation according to one embodiment of the present disclosure.

FIG. 2 is a hydraulic circuit diagram showing a flow of brake fluid for a controller to increase or decrease a pressure in a hydraulic circuit in an EBD situation according to one embodiment of the present disclosure.

Referring to FIG. 2, a thick solid line indicates the flow of the brake fluid.

The EBD function is a function of stably distributing the braking force by adjusting the braking force formed in front or rear wheel brakes. For example, the EBD function is a function of improving the braking performance by adjusting the braking forces of the rear wheel brakes according to a situation of a road surface on which the vehicle travels.

When the driver steps on the brake pedal 101 so that the second backup piston 113 moves forward, a part of the brake fluid discharged from the second backup chamber 119 passes through the first backup valve 194 and is recovered to the reservoir 190. The remaining discharged brake fluid passes through the second backup valve 195 and is introduced into the second main line 166.

Figure 3:
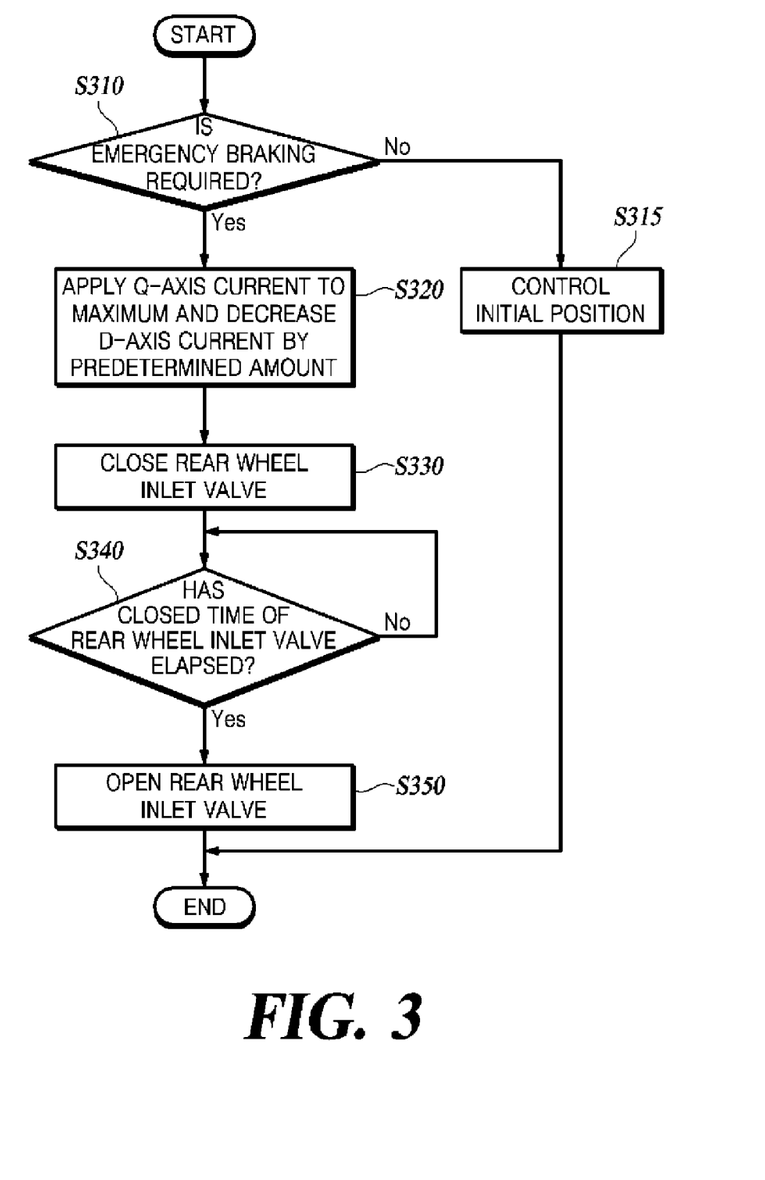
FIG. 3 is a flowchart showing a control process when the controller performs EBD control according to one embodiment of the present disclosure.

FIG. 3 is a flowchart showing a control process when the controller performs EBD control according to one embodiment of the present disclosure.

Referring to FIG. 3, the controller 140 determines whether emergency braking is required to perform an EBD control function (S310). Whether the emergency braking is required may be determined on the basis of a brake pressure requirement. For example, when it is determined that the brake pressure requirement is greater than or equal to a predetermined value, the controller 140 may determine that the emergency braking is required. Meanwhile, the controller 140 may calculate the brake pressure requirement on the basis of the degree of a driver's depression of the brake pedal 101.

When it is determined that the emergency braking is not required for the vehicle, the controller 140 performs initial position control, that is, initialization of the pistons.

On the other hand, when it is determined that the emergency braking is required for the vehicle, the controller 140 controls the motor 152 so that the main master cylinder 120 supplies the hydraulic pressure to the wheel brakes 131, 132, 133, and 134 (S320).

A current Iq contributing to a torque and a current Id contributing to a rotational speed flow in the motor 152. The controller 140 applies the current Iq at a maximum value to increase the hydraulic pressure inside the main master cylinder 120 and decreases the current Id by a predetermined amount.

In an emergency braking situation, for example, when the driver rapidly steps on the brake pedal 101, a large amount of the brake fluid is instantaneously discharged from the backup master cylinder 110. Since the cross-sectional area of the second backup piston 113 is greater than an orifice size of the first backup valve 194, only a part of the discharged braking fluid is recovered to the reservoir 190. For example, a part of the discharged brake fluid passes through the first backup valve 194 and is recovered to the reservoir 190, and the remaining brake fluid passes through the second backup valve 195, is introduced into the second main line 166, and is then supplied to the third wheel brake 133 and the fourth wheel brake 134. Here, the orifice size means the cross-sectional area of a solenoid valve when the brake fluid passes through the solenoid valve and is discharged.

When the brake fluid is supplied only to the third wheel brake 133 and the fourth wheel brake 134, although the braking force is not formed in the first wheel brake 131 and the second wheel brake 132, the braking force is formed in the third wheel brake 133 and the fourth wheel brake 134 earlier, that is, a rear wheel inversion phenomenon occurs. The rear wheel inversion phenomenon means a problem that the pressure of the wheel brake connected to the rear wheel is increased relatively earlier than the pressure of the wheel brake connected to the front wheel, and thus the braking stability of the vehicle is degraded.

Thus, according to one embodiment of the present disclosure, the controller 140 controls the third inlet valve 183 and the fourth inlet valve 184 mounted on the rear wheels to prevent the rear wheel inversion phenomenon. The controller 140 closes the third inlet valve 183 and the fourth inlet valve 184 so that the pressure of the rear wheels is not increased earlier (S330).

The third inlet valve 183 and the fourth inlet valve 184 are closed for a predetermined period, and in the detailed description of the present disclosure, a time during which the third inlet valve 183 and the fourth inlet valve 184 are closed is referred to as a closed time t.

Meanwhile, the closed time period (t) means a period from a time when the third inlet valve 183 and the fourth inlet valve 184 are closed to a time when the amount of fluid in the line satisfies Equation (1).

$$V_1 + f(P) \le V_2 - V_{sub} \qquad \text{Equation (1)}$$

Here, V1 denotes the amount of the brake fluid passing through the first backup valve 194 and recovered to the reservoir 190, f(P) denotes the amount of inflow fluid introduced into the second main line 166, V2 denotes the amount of the brake fluid introduced into the second main chamber 126, and Vsub denotes the total amount of the brake fluid discharged from the backup master cylinder 110.

Here, the amount f(P) of inflow fluid means the amount obtained by subtracting the amount V1 of the brake fluid recovered to the reservoir 190 from the total amount of the brake fluid discharged from the backup master cylinder 110 to order to form a forming pressure P in the second main line 166. For example, when the 30 ml of the brake fluid is discharged from the backup master cylinder 110 and 20 ml of the brake fluid is recovered to the reservoir 190, the amount f(P) of the inflow fluid introduced into the second main line 166 is 10 ml.

Meanwhile, the total amount Vsub of the fluid discharged from the backup master cylinder 110 is calculated on the basis of a displacement dsub by which the backup piston moves and the cross-sectional area Asub of the second backup piston 113. The amount V2 of the brake fluid introduced into the second main chamber 126 is calculated on the basis of a displacement d by which the main piston 122 moves and the cross-sectional area A2 of the two-stage main piston 122b.

The controller 140 determines whether a time during which the third inlet valve 183 and the fourth inlet valve 184 are closed exceeds the closed time period (t) calculated on the basis of Equation (1) (S340).

When the closed time period (t) has not elapsed, operation S340 is continuously repeated.

On the other hand, when the closed time period (t) has elapsed, the controller 140 controls the third inlet valve 183 and the fourth inlet valve 184 to be opened (S350).

After operation S315 and operation S350, the present algorithm is terminated.

As described above, according to the present disclosure, the braking stability of a vehicle when an EBD function is implemented can be improved by preventing a rear wheel inversion phenomenon by closing an inlet valve connected to a rear wheel brake for a predetermined time until a motor reaches a predetermined speed and then opening the inlet valve.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of controlling an electro-hydraulic brake configured to perform an electronic brake-force distribution (EBD) control function, the method comprising:
    an emergency braking determination operation including determining whether emergency braking is required for a vehicle;
    a motor control operation including, in response to determining that the emergency braking is required, controlling a current flowing in a motor connected to a main master cylinder to increase a hydraulic pressure supplied to a plurality of wheel brakes including front and rear wheel brakes;
    a rear wheel inlet valve closing operation including closing an inlet valve connected to the rear wheel brake for a predetermined time so that a first pressure at the rear wheel brake does not increase sooner than a second pressure at the front wheel brake;
    a closed time period calculation operation including calculating a first time period for which the inlet valve has been maintained closed; and
    a rear wheel inlet valve opening operation including:
        determining whether the first time period exceeds a closed time period;
        in response determining that the first time period does not exceed the closed time period, maintaining the inlet valve closed until the first time period reaches the closed time period; and
        in response to determining that the first time period exceeds the closed time period, opening the inlet valve,
    wherein the predetermined closed time period is between a first time when the inlet valve is closed and a second time when $V_1+f(P) \leq V_2 - V_{sub}$ is satisfied, wherein $V_1$ denotes a first amount of fluid recovered to a reservoir using a first backup valve, f(P) denotes an amount of inflow fluid introduced into a line in a hydraulic circuit so that the line supplies a pressure of the second main chamber to the rear wheel brake, $V_2$ denotes a second amount of fluid introduced into the second main chamber, and $V_{sub}$ denotes a third amount of fluid discharged from a backup master cylinder.

2. The method of claim 1, wherein the third amount of fluid discharged from the backup master cylinder is calculated based on a displacement of a movement by a backup piston and a cross-sectional area of the backup piston.

3. The method of claim 1, wherein:
    the main master cylinder further includes a main piston having a one-stage piston and a two-stage main piston, and
    the second amount of fluid introduced into the second main chamber is calculated based on a displacement of a movement by a main piston and a cross-sectional area of the two-stage main piston.

4. The method of claim 1, including calculating a brake pressure requirement based on a degree of a driver's depression of a brake pedal,
    wherein, in the emergency braking determination operation, in response to determining the brake pressure requirement is greater than or equal to a predetermined value, determining that the emergency braking is required.

5. The method of claim 1, wherein, in the motor control operation, controlling the current flowing in the motor includes:
    applying the maximum value of a first current, wherein the first current denotes a current component involved in torque of the motor, and
    decreasing a second current, wherein the second current denotes a current component involved in rotational velocity of the motor.

6. The method of claim 1, wherein the rear wheel inlet valve closing operation further includes supplying the hydraulic pressure to only the wheel brakes that brake the front wheels, which includes:
    closing all inlet valves connected to one or more rear wheels; and
    opening all inlet valves connected to one or more front wheels.

7. The method of claim 1, further comprising a backup valve control operation including controlling a backup valve installed adjacent to a reservoir after the motor control operation,
    wherein the backup valve control operation includes closing the backup valve until an internal pressure in a hydraulic circuit reaches a predetermined pressure.

8. The method of claim 7, wherein the backup valve is located adjacent to the reservoir.

9. A braking system comprising:
    a main master cylinder including a first main chamber, a second main chamber and a main piston;
    a backup master cylinder including a backup piston, a reservoir, a plurality of wheel brakes including front and rear wheel brakes, a valve and a motor; and
    an electro-hydraulic brake device configured to perform an electronic brake-force distribution (EBD) control function comprising:
    determining whether emergency braking is required for a vehicle; and
    controlling an inlet valve connected to a rear wheel brake so that, when pressures of the plurality of wheel brakes are increased, the inlet valve is closed for a closed time period and is then opened to increase a pressure at a front wheel brake sooner than a pressure of a rear wheel brake
        wherein the closed time period is between a first time when the inlet valve is closed and a second time when $V_1+f(P) \leq V_2 - V_{sub}$ is satisfied, wherein $V_1$ denotes a first amount of fluid recovered to a reservoir using a first backup valve, f(P) denotes an amount of inflow fluid introduced into a line in a hydraulic circuit so that the line supplies a pressure of the second main chamber to the rear wheel brake, $V_2$ denotes a second amount of fluid introduced into the second main chamber, and $V_{sub}$ denotes a third amount of fluid discharged from a backup master cylinder.

10. The braking system of claim 9, wherein the third amount of fluid discharged from the backup master cylinder is calculated based on a displacement of a movement by the backup piston and a cross-sectional area of the backup piston.

11. The braking system of claim 9, wherein:
   the main piston includes a one-stage piston and a two-stage main piston, and
   the second amount of fluid introduced into the second main chamber is calculated based on a displacement of a movement by the main piston and a cross-sectional area of the two-stage main piston.

12. The braking system of claim 9, further comprising a depression amount sensor configured to detect a degree of a driver's depression of a brake pedal and generate depression amount information indicative of the detected degree of the driver's depression of the brake pedal,
   wherein the controller determines whether the emergency braking is required on the basis of the depression amount information.

13. The braking system of claim 9, wherein, for increasing the pressures of the plurality of wheel brakes, the EBD control function further includes controlling a current flowing in the motor, which control function includes:
   applying the maximum value of a first current, wherein the first current denotes a current component involved in torque of the motor; and
   decreasing a second current, wherein the second current denotes a current component involved in rotational velocity of the motor.

\* \* \* \* \*